(12) United States Patent
Yamane et al.

(10) Patent No.: US 12,021,223 B2
(45) Date of Patent: Jun. 25, 2024

(54) POSITIVE ELECTRODE FOR ALKALI SECONDARY BATTERY AND ALKALI SECONDARY BATTERY INCLUDING SAID POSITIVE ELECTRODE

(71) Applicant: FDK CORPORATION, Tokyo (JP)

(72) Inventors: Tetsuya Yamane, Tokyo (JP); Yuzo Imoto, Tokyo (JP); Yuya Tanimoto, Tokyo (JP); Masaru Kihara, Tokyo (JP); Hideyuki Asanuma, Tokyo (JP)

(73) Assignee: FDK CORPORATION, Tokyo (JP)

( * ) Notice: Subject to any disclaimer, the term of this patent is extended or adjusted under 35 U.S.C. 154(b) by 777 days.

(21) Appl. No.: 17/275,297

(22) PCT Filed: Aug. 15, 2019

(86) PCT No.: PCT/JP2019/031999
§ 371 (c)(1),
(2) Date: Mar. 11, 2021

(87) PCT Pub. No.: WO2020/059372
PCT Pub. Date: Mar. 26, 2020

(65) Prior Publication Data
US 2022/0052318 A1 Feb. 17, 2022

(30) Foreign Application Priority Data
Sep. 21, 2018 (JP) .................. 2018-177245

(51) Int. Cl.
*H01M 4/32* (2006.01)
*H01M 4/02* (2006.01)
(Continued)

(52) U.S. Cl.
CPC .............. *H01M 4/32* (2013.01); *H01M 4/62* (2013.01); *H01M 10/30* (2013.01); *H01M 2004/028* (2013.01)

(58) Field of Classification Search
CPC .. H01M 2004/028; H01M 10/30; H01M 4/32; H01M 4/62
See application file for complete search history.

(56) References Cited

U.S. PATENT DOCUMENTS 6,706,422 B2  3/2004  Sakamoto et al.
2006/0046135 A1  3/2006  Huang

FOREIGN PATENT DOCUMENTS

CN  1219778 A  6/1999
CN  1905253 A  1/2007
(Continued)

OTHER PUBLICATIONS

Extended European Search Report dated Jun. 7, 2022 for corresponding European Application No. 19863263.0.
(Continued)

*Primary Examiner* — Christopher P Domone
*Assistant Examiner* — Jonathan William Estes
(74) *Attorney, Agent, or Firm* — Kinney & Lange, P.A.

(57) ABSTRACT

A battery 2 includes an outer can 10 and an electrode group 22 that is housed in the outer can 10 together with an alkaline electrolytic solution, in which a positive electrode 24 included in the electrode group 22 includes a positive electrode substrate and a positive electrode mixture supported on the positive electrode substrate, the positive electrode mixture includes nickel hydroxide and a positive electrode additive, the positive electrode additive includes a titanium oxide particle having an anatase-type crystal structure, the titanium oxide particle has an average primary particle size of 5 nm or more and 10 nm or less and a BET specific surface area of 230 $m^2/g$ or more and 360 $m^2/g$ or less, and includes 0.1% by mass or more of niobium, and a
(Continued)

rate of addition of the titanium oxide relative to the nickel hydroxide is 0.1% by mass or more and 1.0% by mass or less.

2 Claims, 1 Drawing Sheet

(51) Int. Cl.
*H01M 4/62* (2006.01)
*H01M 10/30* (2006.01)

(56) References Cited

FOREIGN PATENT DOCUMENTS

| JP | 2001332257 | A |   | 11/2001 |
| JP | 2002025549 | A | * | 1/2002 |
| JP | 2002025549 | A |   | 1/2002 |
| JP | 2002313342 | A | * | 10/2002 |
| JP | 2002313342 | A |   | 10/2002 |
| JP | 2004031292 | A | * | 1/2004 |
| JP | 2004031292 | A |   | 1/2004 |
| JP | 2006313678 | A |   | 11/2006 |
| JP | 2014026899 | A |   | 2/2014 |
| WO | 2011078263 | A1 |  | 6/2011 |

OTHER PUBLICATIONS

International Search Report and Written Opinion dated Nov. 5, 2019, for corresponding PCT Application No. PCT/JP2019/031999.

* cited by examiner

POSITIVE ELECTRODE FOR ALKALI SECONDARY BATTERY AND ALKALI SECONDARY BATTERY INCLUDING SAID POSITIVE ELECTRODE

CROSS-REFERENCE TO RELATED APPLICATION(S)

This application is the national phase of PCT Application No. PCT/JP2019/031999 filed on Aug. 15, 2019, which in turn claims priority to Japanese Application No. 2018-177245 filed on Sep. 21, 2018, both of which are incorporated by reference herein in their entireties.

TECHNICAL FIELD

The present disclosure relates to a positive electrode for an alkali secondary battery and an alkali secondary battery including the positive electrode.

BACKGROUND ART

Nickel hydroxides are used for positive electrode active materials in positive electrodes for use in alkali secondary batteries. Such nickel hydroxides are low in conductivity, and thus have a difficulty in singly enhancing the rate of utilization of positive electrode active materials. Conductive layers are generally formed in order to impart conductivity by precipitating cobalt compounds on surfaces of nickel hydroxide particles and oxidizing the resultant. Such conductive layers on surfaces of nickel hydroxide particles are contacted with each other to thereby form conductive networks. Thus, positive electrodes are increased in conductivity and positive electrode active materials are increased in rate of utilization.

Alkali secondary batteries are increasingly used in applications where such batteries are used in the form of battery packs obtained by combining a plurality of alkali secondary batteries. Examples include driving power sources for electric cars, electricity storage systems of renewable energy, and backup power sources for measures of power failures. Such battery packs, as being charged and discharged, cause reaction heat and/or Joule heat to be generated due to battery reaction, are easily increased in temperature, and are exposed to high temperatures, in many cases. Alkali secondary batteries have been increasingly used recently under a severer environment, for example, a high-temperature environment according to further expansion of applications. In particular, such batteries may be sometimes left to still stand and over-discharged with being connected with any load under a high-temperature environment.

If alkali secondary batteries are thus over-discharged, cobalt compounds described above are reduced to cause breakage of conductive networks, resulting in deterioration in rate of utilization of positive electrode active materials. Such breakage of conductive networks more easily progresses particularly under a high-temperature environment. Such deterioration in rate of utilization of positive electrode active materials results in deterioration in charge acceptance, thereby causing deterioration in alkali secondary battery capacity. In such a case, the initial capacity cannot be secured even if charge is anew made. In other words, the capacity recovery rate is decreased.

It is considered to be effective for avoidance of such failures that reduction of cobalt compounds is suppressed. There are made various researches about methods for suppressing reduction of cobalt compounds. One known example of the methods for suppressing reduction of cobalt compounds is addition of a compound of Ti, Nb, W, Y, Yb and/or the like to a positive electrode mixture (see, for example, Patent Document 1). In other words, such a compound of Ti, Nb, W, Y, Yb and/or the like is added as an additive to the positive electrode mixture, thereby suppressing deterioration in alkali secondary battery capacity.

When the above additive is used, less breakage of conductive networks can be made to thereby allow a capacity close to the initial capacity to be secured even if charge is anew made, and allow for suppression of deterioration in capacity recovery rate.

PRIOR ART DOCUMENT

Patent Document

Patent Document 1: Japanese Patent Laid-Open No. 2004-031292

SUMMARY

There is a case where any equipment into which the above battery pack is incorporated is more severely used. For example, there is a case where an alkali secondary battery not only is left to still stand with being connected with any load under a high-temperature environment for a long period, but also is left to still stand in such a state once and again for a long period.

When the above additive is used, it is sufficiently possible to suppress deterioration in capacity recovery rate as long as there is only about one repetition of a state where an alkali secondary battery is left to still stand under a high-temperature environment with being connected with any load for a long period. However, if such still standing for a long period is made once and again, deterioration in capacity recovery rate cannot be currently suppressed.

Thus, there is a demand for development of an alkali secondary battery which can be suppressed in deterioration in capacity recovery rate even if severely used as described above.

The present disclosure has been made in view of the above circumstances, and an object thereof is to provide a positive electrode for an alkali secondary battery which can be suppressed in deterioration in capacity recovery rate even if left to still stand repeatedly with being connected with any load under a high-temperature environment for a long period, and an alkali secondary battery including the positive electrode.

The present disclosure provides a positive electrode for an alkali secondary battery, including a positive electrode substrate and a positive electrode mixture supported on the positive electrode substrate, wherein the positive electrode mixture includes nickel hydroxide as a positive electrode active material, and a positive electrode additive, the positive electrode additive includes a titanium oxide particle having an anatase-type crystal structure, the titanium oxide particle has an average primary particle size of 5 nm or more and 10 nm or less and a BET specific surface area of 230 $m^2/g$ or more and 360 $m^2/g$ or less and includes 0.1% by mass or more of niobium, and the rate of addition of the titanium oxide relative to the nickel hydroxide is 0.1% by mass or more and 1.0% by mass or less.

A configuration is preferable where the titanium oxide has a purity of 90% by mass or more and 95% by mass or less.

The present disclosure further provides an alkali secondary battery including an outer can and an electrode group that is housed in the outer can together with an alkaline electrolytic solution, wherein the electrode group includes a positive electrode and a negative electrode stacked with a separator being interposed therebetween, and the positive electrode is any one of the above positive electrodes for an alkali secondary battery.

The positive electrode for an alkali secondary battery of the present disclosure includes a positive electrode substrate and a positive electrode mixture supported on the positive electrode substrate, in which the positive electrode mixture includes nickel hydroxide as a positive electrode active material, and a positive electrode additive, the positive electrode additive includes a titanium oxide particle having an anatase-type crystal structure, the titanium oxide particle has an average primary particle size of 5 nm or more and 10 nm or less and a BET specific surface area of 230 $m^2/g$ or more and 360 $m^2/g$ or less and includes 0.1% by mass or more of niobium, and the rate of addition of the titanium oxide relative to the nickel hydroxide is 0.1% by mass or more and 1.0% by mass or less. An alkali secondary battery including a positive electrode using the positive electrode additive satisfying the above conditions can be suppressed in deterioration in capacity recovery rate even if left to still stand repeatedly with being connected with any load under a high-temperature environment for a long period.

DETAILED DESCRIPTION

Hereinafter, an alkali secondary battery to which the present disclosure is applied is described with reference to the drawings. The alkali secondary battery to which the present disclosure is applied is not particularly limited, and a case is described by way of example, where the present disclosure is applied to an AA-size cylindrical nickel-hydrogen secondary battery (hereinafter, referred to as "battery") 2 as illustrated in FIG. 1.

Figure 1:
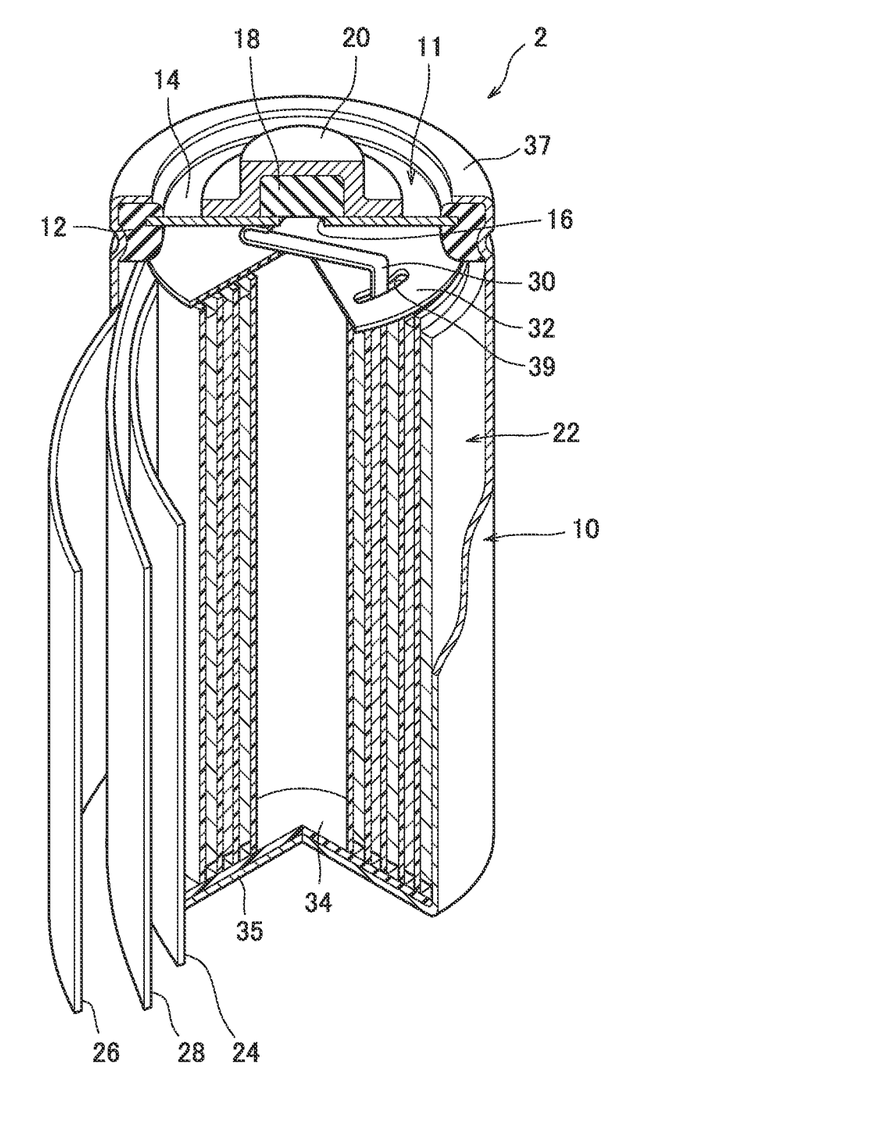
FIG. 1 is a perspective view illustrating a nickel-hydrogen secondary battery according to one embodiment of the present disclosure, in a partially broken manner.

The battery 2 includes a bottomed cylindrical outer can 10 opened at the upper end thereof, as illustrated in FIG. 1. The outer can 10 has conductivity, and a bottom wall 35 thereof serves as a negative electrode terminal. A sealing body 11 is secured in the opening of the outer can 10. The sealing body 11 includes a lid plate 14 and a positive electrode terminal 20, and not only seals the outer can 10, but also provides the positive electrode terminal 20. The lid plate 14 is a disc-shaped member having conductivity. The lid plate 14 and a ring-shaped insulation packing 12 that surrounds the lid plate 14 are disposed in the opening of the outer can 10, and the insulation packing 12 is secured to an opening edge 37 of the outer can 10 by swaging the opening edge 37 of the outer can 10. That is, the lid plate 14 and the insulation packing 12 cooperate with each other to thereby airtightly close the opening of the outer can 10.

The lid plate 14 here has a central through-hole 16 at the center thereof. A rubber valve body 18 that plugs the central through-hole 16 is disposed on an outer surface of the lid plate 14. A metallic positive electrode terminal 20 having a flanged cylindrical shape is electrically connected onto the outer surface of the lid plate 14 so as to cover the valve body 18. The positive electrode terminal 20 pushes the valve body 18 towards the lid plate 14. The positive electrode terminal 20 here has a vent hole opened, not illustrated.

The central through-hole 16 is airtightly closed by the valve body 18 in normal times. When any gas is generated in the outer can 10 and the internal pressure is increased, the valve body 18 is compressed by the internal pressure to open the central through-hole 16, thereby allowing such any gas to be outwardly released from the outer can 10 through the central through-hole 16 and the vent hole (not shown) of the positive electrode terminal 20. In other words, the central through-hole 16, the valve body 18 and the positive electrode terminal 20 form a safety valve for a battery.

The outer can 10 receives an electrode group 22. The electrode group 22 includes belt-shaped positive electrode 24, negative electrode 26 and separator 28, and is spirally wound in the state where the separator 28 is sandwiched between the positive electrode 24 and the negative electrode 26. That is, the positive electrode 24 and the negative electrode 26 are stacked on each other with the separator 28 being interposed therebetween. The outermost periphery of the electrode group 22 is formed by one portion (outermost peripheral portion) of the negative electrode 26, and is in contact with an inner peripheral wall surface of the outer can 10. That is, the negative electrode 26 and the outer can 10 are electrically connected to each other.

A positive electrode lead 30 is disposed between one end of the electrode group 22 and the lid plate 14, in the outer can 10. Specifically, the positive electrode lead 30 is connected to the positive electrode 24 at one end thereof and is connected to the lid plate 14 at other end thereof. Accordingly, the positive electrode terminal 20 and the positive electrode 24 are electrically connected to each other via the positive electrode lead 30 and the lid plate 14. A round upper insulation member 32 is disposed between the lid plate 14 and the electrode group 22, and the positive electrode lead 30 extends through a slit 39 provided in the upper insulation member 32. A round lower insulation member 34 is also disposed between the electrode group 22 and the bottom of the outer can 10.

A predetermined amount of an alkaline electrolytic solution (not shown) is injected into the outer can 10. The alkaline electrolytic solution, with which the electrode group 22 is impregnated, progresses a charge/discharge reaction between the positive electrode 24 and the negative electrode 26. The alkaline electrolytic solution here used is preferably an alkaline electrolytic solution including KOH, NaOH, LiOH, or the like as a solute.

The material of the separator 28 can be, for example, a non-woven cloth made of fibers of polyamide, to which a hydrophilic functional group is imparted, or a non-woven cloth made of fibers of polyolefin such as polyethylene or polypropylene, to which a hydrophilic functional group is imparted.

The positive electrode 24 includes a positive electrode substrate and a positive electrode mixture supported on the positive electrode substrate.

The positive electrode substrate is formed by a conductive material having a three-dimensional network structure. The positive electrode substrate here used can be, specifically, a mesh, spongy or fibrous metal object nickel-plated, or foamed nickel.

The positive electrode mixture includes a positive electrode active material particle, a positive electrode additive, and a binder. The binder serves to bind the positive electrode active material particle and the positive electrode additive to the positive electrode substrate. The binder serves to bind the constituent materials of the positive electrode mixture to the positive electrode substrate. The binder can be, for example, carboxymethylcellulose, methylcellulose, a PTFE (polytetrafluoroethylene) dispersion, or an HPC (hydroxypropylcellulose) dispersion.

The positive electrode active material particle used is a nickel hydroxide particle or a high-order nickel hydroxide particle. Such a nickel hydroxide particle is preferably, if necessary, in the form of a solid solution with zinc or cobalt.

An aspect is adopted where a conductive layer including a cobalt compound is formed on the surface of such a nickel hydroxide particle. The cobalt compound here used is preferably, for example, cobalt hydroxide ($Co(OH)_2$) or cobalt oxide (CoO). The cobalt compound of the conductive layer is preferably highly ordered in advance so as to be hardly reduced.

The positive electrode additive serves to inhibit the cobalt compound of the conductive layer from being reduced and inhibit a conductive network from being broken. The positive electrode additive in the present disclosure includes titanium oxide.

Crystal structures of titanium oxide include rutile-type, anatase-type, and brookite-type structures. In particular, rutile-type and anatase-type titanium oxides are generally used. In the present disclosure, titanium oxide having an anatase-type structure of such two crystal structures is used. A battery to which a rutile-type titanium oxide is added basically exhibits properties similar to those of a battery to which an anatase-type titanium oxide is added. Such a battery of a rutile-type titanium oxide exhibits a capacity recovery rate equivalent to that of such a battery of an anatase-type titanium oxide after still standing at the first time, with respect to the capacity recovery rate of a battery left to still stand with being connected with any load.

However, in the case of a usage aspect where reduction of a cobalt compound is not avoided, for example, a battery is left to still stand with being connected with any load or is repeatedly subjected to reverse charge, use of an anatase-type titanium oxide results in a higher capacity recovery rate than that in use of a rutile-type titanium oxide. An anatase-type titanium oxide is considered to serve to not only suppress reduction of a cobalt compound layer on the surface of a positive electrode active material particle, but also easily convert such a cobalt compound reduced, to a cobalt compound oxidized, namely, result in an increase in reversibility. An anatase-type titanium oxide also easily results in an increase in specific surface area and contributes to improvements in properties of a battery, as compared with a rutile-type titanium oxide. An anatase-type titanium oxide is thus used, thereby less causing deterioration in capacity recovery rate even if a battery is left to still stand repeatedly under a high-temperature environment with being connected with any load, and thus allowing the effect of enhancing durability of a battery to be obtained.

Any anatase-type titanium oxide, which is in the form of an ultrafine particle having an average primary particle size of 5 nm or more and 10 nm or less and a BET specific surface area of 230 $m^2/g$ or more, more remarkably exerts the above effect. The anatase-type titanium oxide herein has an upper limit value of the BET specific surface area, of 360 $m^2/g$ or less. The reason for this is because any anatase-type titanium oxide having a BET specific surface area of more than 360 $m^2/g$ is difficult to produce according to an existing industrial production method.

The average particle size in the present disclosure here refers to a volume average particle size obtained by measuring the particle size distribution on volume basis of a powder as an aggregate of an objective particle, by use of a laser diffraction/scattering particle size distribution measurement apparatus. The BET specific surface area represents the specific surface area measured according to a nitrogen gas adsorption BET method with a specific surface area measurement apparatus.

The titanium oxide here used is preferably one having a purity of 90% by mass or more and 95% by mass or less. The titanium oxide, when has a purity of 90% by mass or more, does not cause any remarkable deterioration in capacity recovery rate in the case of repeating of still standing as described above, and can be sufficiently used. On the other hand, a too high purity causes a decreased effect of suppressing deterioration in capacity recovery rate in the case of repeating of still standing as described above. Accordingly, the purity of the titanium oxide is preferably 95% by mass or less.

The purity of the titanium oxide is represented by the content of the titanium oxide after dewatering and drying. In the present disclosure, the content of the titanium oxide after dewatering and drying is measured by subjecting a sample of the titanium oxide used, which is heated to 105° C., held for 24 hours and dried, to K5116 7.2 of the Japan Industrial Standard (JIS). Specifically, a titanium oxide material generally distributed mainly includes titanium oxide and titanium oxide hydrate or titanium hydroxide. The amount of the titanium oxide included in the titanium oxide material is determined from the equivalent of the titanium oxide and represented by the mass fraction, and the mass fraction is defined as the content, namely, the purity, of the titanium oxide.

Herein, a titanium oxide secondary particle generally has a size of 3.0 μm or less regardless of the primary particle size.

The titanium oxide in the present disclosure includes 0.1% by mass or more of niobium. Such niobium, which is in the form of niobium oxide, constitutes a solid solution in the titanium oxide.

The content of such niobium in the solid solution in the titanium oxide is preferably 0.1% by mass or more and 1.0% by mass or less. A content of such niobium, of less than 0.1% by mass, causes the effect of suppressing deterioration in capacity recovery rate to be lower, and a content of such niobium, of more than 1.0% by mass, causes the effect of suppressing deterioration in capacity recovery rate to be saturated.

The above-mentioned titanium oxide as the positive electrode additive can be added in an amount of 0.1% by mass or more and 1.0% by mass or less relative to the nickel hydroxide as the positive electrode active material, thereby less causing deterioration in capacity recovery rate even if a battery is left to still stand repeatedly under a high-temperature environment with being connected with any load, and allowing the effect of enhancing durability of a battery to be more increased.

The positive electrode additive desirably includes a rare-earth component such as yttrium oxide, separately added as other component. For example, yttrium oxide can more stabilize the above effect of the titanium oxide.

The yttrium oxide here is a particle having an average particle size of 1 μm or more and 5 μm or less, and a yttrium oxide powder having a 90% particle size of 20 μm or less is prepared and the yttrium oxide powder is mixed with the titanium oxide powder, thereby providing a positive electrode additive.

The yttrium oxide here can be added in an amount of 0.1% by mass or more and 1.0% by mass or less relative to the nickel hydroxide as the positive electrode active material, thereby more stabilizing the above effect of the titanium oxide.

The positive electrode 24 can be produced, for example, as follows.

First, a positive electrode additive, water and a binder are added to a positive electrode active material powder as an aggregate of a positive electrode active material particle, and the resultant is kneaded to thereby prepare a positive electrode mixture slurry. The resulting positive electrode mixture slurry is, for example, packed in foamed nickel, and dried. After the drying, such foamed nickel where nickel hydroxide particle and the like are packed is rolled and then cut. Thus, the positive electrode 24 on which the positive electrode mixture is supported is obtained.

Next, the negative electrode 26 is described.

The negative electrode 26 has a belt-shaped conductive negative electrode core, and a negative electrode mixture is retained in the negative electrode core.

The negative electrode core is a sheet-shaped metal material where a through-hole is distributed, and, for example, a punching metal sheet can be used. The negative electrode mixture is not only packed in the through-hole of the negative electrode core, but also retained on both surfaces of the negative electrode core in a layered manner.

The negative electrode mixture includes a hydrogen storage alloy particle capable of storing and releasing hydrogen, as a negative electrode active material, a conductive material, and a binder. The binder serves to not only bind the hydrogen storage alloy particle, a negative electrode additive, and the conductive material to one another, but also bind the negative electrode mixture to the negative electrode core. The binder here used can be a hydrophilic or hydrophobic polymer, and the conductive material here used can be carbon black or graphite. The negative electrode additive may be, if necessary, added.

The hydrogen storage alloy in the hydrogen storage alloy particle is suitably one for use in a common nickel-hydrogen secondary battery.

The negative electrode 26 can be produced, for example, as follows.

First, a hydrogen storage alloy powder as an aggregate of a hydrogen storage alloy particle, a conductive material, a binder and water are kneaded to thereby prepare a negative electrode mixture paste. The resulting negative electrode mixture paste is applied to a negative electrode core, and dried. After the drying, the negative electrode core to which the hydrogen storage alloy particle and the like are attached is rolled and cut. Thus, the negative electrode 26 is produced.

The positive electrode 24 and the negative electrode 26, produced as above, are spirally wound with the separator 28 being interposed therebetween, thereby forming the electrode group 22.

The electrode group 22 thus obtained is housed in the outer can 10. Subsequently, a predetermined amount of the alkaline electrolytic solution is injected into the outer can 10. Thereafter, the outer can 10 in which the electrode group 22 and the alkaline electrolytic solution are housed is sealed by the lid plate 14 provided with the positive electrode terminal 20, thereby providing the battery 2 according to the present disclosure. The resulting battery 2 is subjected to an initial activation treatment, and thus is in an available state.

The positive electrode for an alkali secondary battery according to the present disclosure includes an anatase-type titanium oxide particle as the positive electrode additive. The titanium oxide particle is a particle having an average primary particle size of 5 nm or more and 10 nm or less and a BET specific surface area of 230 $m^2/g$ or more and 360 $m^2/g$ or less, and includes 0.1% by mass or more of niobium. The rate of addition of such titanium oxide relative to the nickel hydroxide as the positive electrode active material is 0.1% by mass or more and 1.0% by mass or less. The positive electrode additive serves to not only suppress reduction of a cobalt compound layer on the surface of the positive electrode active material particle, but also easily convert such a cobalt compound reduced, to a cobalt compound oxidized, and thus an alkali secondary battery including a positive electrode including the positive electrode additive is less deteriorated in capacity recovery rate even if left to still stand repeatedly under a high-temperature environment with being connected with any load. In other words, the present disclosure provides an excellent alkali secondary battery which can withstand use where such a battery is left to still stand repeatedly under a high-temperature environment with being connected with any load.

EXAMPLES

1. Production of Battery

Example 1

(1) Production of Positive Electrode

Nickel sulfate, zinc sulfate and cobalt sulfate were weighed so that the rate of zinc and that of cobalt relative to nickel were 4% by mass and 1% by mass, respectively, and added to an aqueous 1 N sodium hydroxide solution including ammonium ions, thereby preparing a mixed aqueous solution. While the resulting mixed aqueous solution was stirred, an aqueous 10 N sodium hydroxide solution was gradually added to the mixed aqueous solution to allow a reaction to occur, and the pH in the reaction was stabilized to 13 to 14, thereby producing a base particle in the form of a solid solution with zinc and cobalt, mainly containing nickel hydroxide.

The resulting base particle was washed with pure water in an amount of 10-fold, three times, and thereafter dewatered and dried. The resulting base particle had a spherical shape having an average particle size of 10 μm.

Next, the resulting base particle was loaded to an aqueous ammonia solution, and an aqueous cobalt sulfate solution was added thereto with the pH in the reaction being kept at 9 to 10. Thus, the base particle served as a nucleus and cobalt hydroxide was precipitated on the surface of the nucleus, thereby providing an intermediate particle including a cobalt hydroxide layer having a thickness of about 0.1 μm. Next, the intermediate particle was convected in the presence of sodium hydroxide in high-temperature air containing oxygen under an environment at 80° C., and was subjected to a heat treatment for 45 minutes. Thus, not only the cobalt hydroxide on the surface of the intermediate particle was converted to cobalt oxyhydroxide high in conductivity, but also sodium was incorporated into a cobalt oxyhydroxide layer and a conductive layer including a sodium-containing cobalt oxyhydroxide was formed. Thereafter, a particle including such a conductive layer of cobalt oxyhydroxide was collected by filtration, washed with water and then dried at 60° C. Thus, a positive electrode active material powder was obtained which was an aggregate of a positive electrode active material particle having a conductive layer formed by cobalt oxyhydroxide on the surface of a base particle.

Next, a positive electrode additive was prepared as follows.

A titanium oxide powder of an aggregate of a titanium oxide particle was prepared which was an anatase-type titanium oxide particle having a purity (content after dewatering and drying) of 90% by mass and which had an average primary particle size of 5 nm and a BET specific surface area of 360 m²/g.

The titanium oxide particle constituted a solid solution with niobium, and 0.3% by mass of the niobium was included in the form of niobium oxide. The amount of such a solid solution of the niobium oxide was shown, as the content rate of niobium, in Table 1.

Furthermore, an yttrium oxide powder was prepared which was an aggregate of an yttrium oxide particle having an average particle size of 2.5 μm. Next, 0.8 parts by mass of the yttrium oxide powder and 0.2 parts by mass of titanium oxide were mixed, thereby providing a positive electrode additive powder.

Next, 99.0 parts by mass of the positive electrode active material powder was mixed with 1.0 part by mass of the positive electrode additive powder, 0.2 parts by mass of an HPC powder, 0.3 parts by mass of a PTFE dispersion liquid and 30 parts by mass of water, thereby preparing a positive electrode active material slurry, and the positive electrode active material slurry was packed in foamed nickel as a positive electrode substrate, and then dried. Thus, an intermediate product of a positive electrode was obtained in which a positive electrode active material particle and the like were packed in foamed nickel.

The resulting intermediate product was rolled so as to have a thickness of 0.52 mm, and thereafter cut to a predetermined dimension, thereby providing a positive electrode 24 for AA size. The positive electrode included 0.2% by mass of titanium oxide as the positive electrode additive and 0.8% by mass of yttrium oxide as the positive electrode additive, relative to nickel hydroxide as the positive electrode active material. Such values are shown in Table 1, as the rate of addition of the titanium oxide relative to the positive electrode active material and the rate of addition of the yttrium oxide relative to the positive electrode active material, respectively.

(2) Production of hydrogen storage alloy and negative electrode

First, a rare-earth component including 12% by mass of La and 88% by mass of Sm was prepared. The resulting rare-earth component, Mg, Ni, and Al were weighed, and a mixture was prepared where the molar ratio thereof was 0.90:0.10:3.40:0.10. The resulting mixture was molten in an induction melting furnace, and the melt was poured into a mold and then cooled to room temperature (about 25° C.), thereby providing a hydrogen storage alloy ingot.

Next, the ingot was subjected to a heat treatment for retention under an argon gas atmosphere at a temperature of 1000° C. for 10 hours. After the heat treatment, the ingot was cooled to room temperature (about 25° C.). A sample was collected from the ingot after the heat treatment, and was subjected to compositional analysis according to an inductivity coupled plasma optical emission spectrometric method (ICP). As a result, the composition of the hydrogen storage alloy was $(La_{0.12}Sm_{0.88})_{0.90}Mg_{0.10}Ni_{3.40}Al_{0.10}$.

Next, the hydrogen storage alloy ingot after the heat treatment was pulverized in an argon gas atmosphere, thereby providing a hydrogen storage alloy powder as an aggregate of a hydrogen storage alloy particle. The resulting hydrogen storage alloy powder was subjected to particle size measurement with a laser diffraction/scattering particle size distribution measurement apparatus, and as a result, the hydrogen storage alloy particle had a volume average particle size (MV) of 60 μm.

To 100 parts by mass of the resulting hydrogen storage alloy powder were added 0.4 parts by mass of a sodium polyacrylate powder, 0.1 parts by mass of a carboxymethylcellulose powder, 1.0 part by mass (in terms of solid content) of a styrene/butadiene rubber (SBR) dispersion (solid content: 50% by mass), 1.0 part by mass of a carbon black powder, and 30 parts by mass of water, and the resultant was kneaded, thereby preparing a negative electrode mixture paste.

Both surfaces of a perforated plate made of iron, as a negative electrode core, were uniformly coated with the negative electrode mixture paste so that the thickness was constant. The perforated plate had a thickness of 60 μm, and the surfaces thereof were nickel-plated.

After the paste was dried, the perforated plate to which the hydrogen storage alloy powder was attached was further rolled to result in an increase in amount per volume of the alloy, and then cut, thereby providing a negative electrode 26 for AA size.

(3) Production of Nickel-Hydrogen Secondary Battery

The resulting positive electrode 24 and negative electrode 26 were spirally wound with a separator 28 being interposed therebetween, thereby producing an electrode group 22. The separator 28 here used in production of the electrode group 22 was a sulfonated separator obtained by sulfonating a non-woven cloth made of fibers of polypropylene, by oleum pyrosulfuric acid, and then neutralizing the resultant by an aqueous sodium hydroxide solution, and had a thickness of 0.14 mm (mass per unit area: 60 g/m²).

KOH, NaOH and LiOH were weighed, and such KOH, NaOH and LiOH were loaded to ion exchange water, thereby preparing an alkaline electrolytic solution having a total concentration of 7.0 N and containing 5.0 N of KOH, 1.0 N of NaOH and 1.0 N of LiOH and thus mainly containing KOH.

Next, the electrode group 22 was accommodated in a bottomed cylindrical outer can 10, and 2.2 ml of the alkaline electrolytic solution prepared was poured thereinto. Thereafter, the opening of the outer can 10 was plugged by a sealing body 11, thereby producing an AA-size nickel-hydrogen secondary battery 2 having a nominal capacity of 1100 mAh.

(4) Initial Activation Treatment

The battery 2 was subjected to an initial activation treatment by repeatedly performing a charge/discharge operation five times, the operation including charge at 0.2 C for 16 hours and discharge to a battery voltage of 1.0 V at 0.4 C, under an environment at a temperature of 25° C. The battery 2 was thus in an available state.

Example 2

A nickel-hydrogen secondary battery 2 in an available state was produced in the same manner as in Example 1 except that a titanium oxide powder as an aggregate of a titanium oxide particle was prepared which was an anatase-type titanium oxide particle having a purity (content after dewatering and drying) of 93% by mass and had a content rate of niobium of 0.3% by mass, an average primary particle size of 6 nm and a BET specific surface area of 330 m²/g.

Example 3

A nickel-hydrogen secondary battery 2 in an available state was produced in the same manner as in Example 1 except that a titanium oxide powder as an aggregate of a titanium oxide particle was prepared which was an anatase-type titanium oxide particle having a purity (content after dewatering and drying) of 95% by mass and had a content rate of niobium of 0.3% by mass, an average primary particle size of 10 nm and a BET specific surface area of 230 m$^2$/g.

Example 4

A nickel-hydrogen secondary battery 2 in an available state was produced in the same manner as in Example 1 except that a titanium oxide powder as an aggregate of a titanium oxide particle was prepared which was an anatase-type titanium oxide particle having a purity (content after dewatering and drying) of 99% by mass and had a content rate of niobium of 0.3% by mass, an average primary particle size of 10 nm and a BET specific surface area of 230 m$^2$/g.

Example 5

A nickel-hydrogen secondary battery 2 in an available state was produced in the same manner as in Example 1 except that a titanium oxide powder as an aggregate of a titanium oxide particle was prepared which was an anatase-type titanium oxide particle having a purity (content after dewatering and drying) of 93% by mass and had a content rate of niobium of 0.3% by mass, an average primary particle size of 6 nm and a BET specific surface area of 330 m$^2$/g, the rate of addition of the titanium oxide relative to the positive electrode active material was 0.1% by mass, and 99.1 parts by mass of the positive electrode active material powder was mixed with 0.9 parts by mass of the positive electrode additive powder, 0.2 parts by mass of an HPC powder, 0.3 parts by mass of a PTFE, dispersion liquid and 30 parts by mass of water, thereby preparing a positive electrode active material slurry.

Example 6

A nickel-hydrogen secondary battery 2 in an available state was produced in the same manner as in Example 1 except that a titanium oxide powder as an aggregate of a titanium oxide particle was prepared which was an anatase-type titanium oxide particle having a purity (content after dewatering and drying) of 93% by mass and had a content rate of niobium of 0.1% by mass, an average primary particle size of 6 nm and a BET specific surface area of 330 m$^2$/g.

Example 7

A nickel-hydrogen secondary battery 2 in an available state was produced in the same manner as in Example 1 except that a titanium oxide powder as an aggregate of a titanium oxide particle was prepared which was an anatase-type titanium oxide particle having a purity (content after dewatering and drying) of 93% by mass and had a content rate of niobium of 1.0% by mass, an average primary particle size of 6 nm and a BET specific surface area of 330 m$^2$/g.

Example 8

A nickel-hydrogen secondary battery 2 in an available state was produced in the same manner as in Example 1 except that a titanium oxide powder as an aggregate of a titanium oxide particle was prepared which was an anatase-type titanium oxide particle having a purity (content after dewatering and drying) of 93% by mass and had a content rate of niobium of 0.3% by mass, an average primary particle size of 6 nm and a BET specific surface area of 330 m$^2$/g, the rate of addition of the titanium oxide relative to the positive electrode active material was 1.0% by mass, and 98.2 parts by mass of the positive electrode active material powder was mixed with 1.8 parts by mass of the positive electrode additive powder, 0.2 parts by mass of an HPC powder, 0.3 parts by mass of a PTFE, dispersion liquid and 30 parts by mass of water, thereby preparing a positive electrode active material slurry.

Comparative Example 1

A nickel-hydrogen secondary battery 2 in an available state was produced in the same manner as in Example 1 except that a titanium oxide powder as an aggregate of a titanium oxide particle was prepared which was an anatase-type titanium oxide particle having a purity (content after dewatering and drying) of 99% by mass and had a content rate of niobium of 0.3% by mass, an average primary particle size of 15 nm and a BET specific surface area of 100 m$^2$/g.

Comparative Example 2

A nickel-hydrogen secondary battery 2 in an available state was produced in the same manner as in Example 1 except that a titanium oxide powder as an aggregate of a titanium oxide particle was prepared which was an anatase-type titanium oxide particle having a purity (content after dewatering and drying) of 99.9% by mass and had a content rate of niobium of 0.3% by mass, an average primary particle size of 150 nm and a BET specific surface area of 13 m$^2$/g.

Comparative Example 3

A nickel-hydrogen secondary battery 2 in an available state was produced in the same manner as in Example 1 except that a titanium oxide powder as an aggregate of a titanium oxide particle was prepared which was a rutile-type titanium oxide particle having a purity (content after dewatering and drying) of 99% by mass and had a content rate of niobium of 0.3% by mass, an average primary particle size of 15 nm and a BET specific surface area of 100 m$^2$/g.

Comparative Example 4

A nickel-hydrogen secondary battery 2 in an available state was produced in the same manner as in Example 1 except that a titanium oxide powder as an aggregate of a titanium oxide particle was prepared which was a rutile-type titanium oxide particle having a purity (content after dewatering and drying) of 99.9% by mass and had a content rate of niobium of 0.3% by mass, an average primary particle size of 150 nm and a BET specific surface area of 8 m$^2$/g.

Comparative Example 5

A nickel-hydrogen secondary battery 2 in an available state was produced in the same manner as in Example 1 except that a titanium oxide powder as an aggregate of a titanium oxide particle was prepared which was an anatase-type titanium oxide particle having a purity (content after dewatering and drying) of 93% by mass and had a content rate of niobium of 0.3% by mass, an average primary particle size of 6 nm and a BET specific surface area of 330 m²/g, the rate of addition of the titanium oxide relative to the positive electrode active material was 0.05% by mass, and 99.15 parts by mass of the positive electrode active material powder was mixed with 0.85 parts by mass of the positive electrode additive powder, 0.2 parts by mass of an HPC powder, 0.3 parts by mass of a PTFE, dispersion liquid and 30 parts by mass of water, thereby preparing a positive electrode active material slurry.

Comparative Example 6

A nickel-hydrogen secondary battery 2 in an available state was produced in the same manner as in Example 1 except that a titanium oxide powder as an aggregate of a titanium oxide particle was prepared which was an anatase-type titanium oxide particle having a purity (content after dewatering and drying) of 99% by mass and had a content rate of niobium of 0.03% by mass, an average primary particle size of 10 nm and a BET specific surface area of 230 m²/g.

Comparative Example 7

A nickel-hydrogen secondary battery 2 in an available state was produced in the same manner as in Example 1 except that a titanium oxide powder as an aggregate of a titanium oxide particle was prepared which was an anatase-type titanium oxide particle having a purity (content after dewatering and drying) of 93% by mass and had a content rate of niobium of 0.3% by mass, an average primary particle size of 6 nm and a BET specific surface area of 330 m²/g, the rate of addition of the titanium oxide relative to the positive electrode active material was 2.0% by mass, and 97.2 parts by mass of the positive electrode active material powder was mixed with 2.8 parts by mass of the positive electrode additive powder, 0.2 parts by mass of an HPC powder, 0.3 parts by mass of a PTFE, dispersion liquid and 30 parts by mass of water, thereby preparing a positive electrode active material slurry.

TABLE 1

| | Positive electrode additive | | | | | Rate [% by mass] of addition of titanium oxide relative to positive electrode active material | Rate [% by mass] of addition of yttrium oxide relative to positive electrode active material |
|---|---|---|---|---|---|---|---|
| | Titanium oxide | | | | | | |
| | Crystal structure | Average primary particle size [nm] | BET specific surface area [m²/g] | Purity [% by mass] | Content rate [% by mass] of niobium | | |
| Example 1 | Anatase | 5 | 360 | 90 | 0.3 | 0.2 | 0.8 |
| Example 2 | Anatase | 6 | 330 | 93 | 0.3 | 0.2 | 0.8 |
| Example 3 | Anatase | 10 | 230 | 95 | 0.3 | 0.2 | 0.8 |
| Example 4 | Anatase | 10 | 230 | 99 | 0.3 | 0.2 | 0.8 |
| Example 5 | Anatase | 6 | 330 | 93 | 0.3 | 0.1 | 0.8 |
| Example 6 | Anatase | 6 | 330 | 93 | 0.1 | 0.2 | 0.8 |
| Example 7 | Anatase | 6 | 330 | 93 | 1.0 | 0.2 | 0.8 |
| Example 8 | Anatase | 6 | 330 | 93 | 0.3 | 1.0 | 0.8 |
| Comparative Example 1 | Anatase | 15 | 100 | 99 | 0.3 | 0.2 | 0.8 |
| Comparative Example 2 | Anatase | 150 | 13 | 99.9 | 0.3 | 0.2 | 0.8 |
| Comparative Example 3 | Rutile | 15 | 100 | 99 | 0.3 | 0.2 | 0.8 |
| Comparative Example 4 | Rutile | 150 | 8 | 99.9 | 0.3 | 0.2 | 0.8 |
| Comparative Example 5 | Anatase | 6 | 330 | 93 | 0.3 | 0.05 | 0.8 |
| Comparative Example 6 | Anatase | 10 | 230 | 99 | 0.03 | 0.2 | 0.8 |
| Comparative Example 7 | Anatase | 6 | 330 | 93 | 0.3 | 2.0 | 0.8 |

2. Evaluation of Nickel-Hydrogen Secondary Battery (1) Unit Capacity

Each of the batteries of Examples 1 to 8 and Comparative Examples 1 to 7, which was subjected to the initial activation treatment, was charged to 160% of the nominal capacity by a charge current of 0.1 C applied under an environment of 25° C., and thereafter was left to still stand for 60 minutes. Next, the resultant was discharged to a battery voltage of 1.0 V at 0.2 C under the same environment. The discharge capacity of such each battery here was measured. The discharge capacity here was defined as the initial capacity. The respective masses of the active material and the additive included in the positive electrode were calculated, thereby providing the calculated mass. Next, the above-mentioned initial capacity was divided by the calculated mass, and the capacity per mass, namely, the unit capacity [mAh/g] of the positive electrode was calculated. The result, as the unit capacity, was described in Table 2.

(2) Capacity Recovery Rate

Each of the batteries of Examples 1 to 8 and Comparative Examples 1 to 7, which was subjected to the initial activation treatment, was charged to 160% of the nominal capacity by a charge current of 0.1 C applied under an environment of 25° C., and thereafter was left to still stand for 60 minutes. Next, the resultant was discharged to a battery voltage of 1.0 V at 0.2 C under the same environment. The discharge capacity of such each battery here was measured. The discharge capacity here was defined as the initial capacity.

Such each battery of Examples 1 to 8 and Comparative Examples 1 to 7 was again charged to 160% of the nominal capacity by applying a charge current at 0.1 C under the same environment.

Next, a resistor of 2 n was connected to such each battery, and such each battery was in the state of being connected with any load. Such each battery in the state was housed in a constant-temperature bath kept at an internal temperature of 60° C., and left to still stand for two weeks.

Such each battery after a lapse of two weeks was taken out from the constant-temperature bath. The resistor was taken out from such each battery. Thereafter, such each battery was charged to 160% of the nominal capacity by applying a charge current at 0.1 C under an environment of 25° C., and thereafter was left to still stand for 60 minutes. Next, the resultant was discharged to a battery voltage of 1.0 V at 0.2 C under the same environment. The discharge capacity of such each battery here was measured. The discharge capacity here was defined as the capacity after still standing.

The capacity recovery rate was determined according to the following expression (I).

Capacity recovery rate [%]=Capacity after still standing/Initial capacity×100     (I)

The capacity recovery rate was defined as the first capacity recovery rate, and shown in Table 2.

Next, such each battery subjected to measurement of the capacity after still standing was again charged to 160% of the nominal capacity by applying a charge current at 0.1 C under an environment of 25° C., and thereafter was left to still stand for 60 minutes. Thereafter, a resistor of 2Ω was connected to such each battery, and such each battery was in the state of being connected with any load. Such each battery in the state was housed in a constant-temperature bath kept at an internal temperature of 60° C., and left to still stand for two weeks. Such each battery after a lapse of two weeks was taken out from the constant-temperature bath, and the resistor was taken out therefrom. Such each battery was again charged to 160% of the nominal capacity by applying a charge current at 0.1 C under an environment of 25° C., and thereafter was left to still stand for 60 minutes. Next, the resultant was discharged to a battery voltage of 1.0 V at 0.2 C under the same environment. The capacity after still standing of such each battery here was measured.

The above operation including charge, still standing in the state of connection with any load, charge, and discharge, as described above, was repeated five times. The capacity recovery rate of such each battery after the completion of the operation was determined according to expression (I). The result obtained was shown in Table 2, as the fifth capacity recovery rate.

It is indicated that, as the capacity recovery rate is higher, charge closer to the initial state can be made and recovery can be made. In particular, it is indicated that a battery high in the fifth capacity recovery rate can be suppressed in reduction of cobalt hydroxide on the surface of a nickel hydroxide particle even if left to still stand repeatedly with being connected with a resistor, and has durability against still standing repeated.

TABLE 2

| | Capacity recovery rate [%] | | Unit capacity |
| --- | --- | --- | --- |
| | First | Fifth | [mAh/g] |
| Example 1 | 99.8 | 91.6 | 243.3 |
| Example 2 | 99.8 | 91.6 | 243.8 |
| Example 3 | 99.8 | 91.7 | 243.6 |
| Example 4 | 99.8 | 90.2 | 243.8 |
| Example 5 | 99.8 | 91.4 | 244.8 |
| Example 6 | 99.8 | 91.3 | 243.8 |
| Example 7 | 99.9 | 91.6 | 244.0 |
| Example 8 | 99.9 | 91.5 | 240.1 |
| Comparative Example 1 | 99.9 | 85.2 | 243.8 |
| Comparative Example 2 | 99.9 | 79.3 | 244.5 |
| Comparative Example 3 | 99.9 | 85.7 | 243.6 |
| Comparative Example 4 | 99.8 | 78.6 | 244.3 |
| Comparative Example 5 | 99.9 | 85.8 | 245.1 |
| Comparative Example 6 | 99.8 | 88.2 | 243.8 |
| Comparative Example 7 | 99.7 | 91.4 | 232.2 |

(3) Discussion

It was found from the above results that a battery including a positive electrode obtained by adopting a positive electrode additive including titanium oxide having an anatase-type crystal structure, including 0.1% by mass or more of niobium and having an average primary particle size of 5 nm or more and 10 nm or less and a BET specific surface area of 230 m²/g or more and 360 m²/g or less and adding 0.1% by mass or more and 1.0% by mass or less of the titanium oxide to a positive electrode active material could be less deteriorated in level of the capacity recovery rate even if left to still stand multiple times under a high-temperature environment with being connected with any load. It can be thus said that inclusion of a positive electrode additive including titanium oxide satisfying the above conditions, in a positive electrode, is effective for providing the effect of suppressing deterioration in capacity recovery rate of a battery when a battery in the state of being connected with any load is left to still stand under a high-temperature environment multiple times.

It was also found that titanium oxide having a purity in the range of 90% by mass or more and 95% by mass or less was adopted to thereby impart any favorable result about suppression of deterioration in capacity recovery rate when a battery being connected with any load was left to still stand under a high-temperature environment multiple times. It can be thus said that setting of the purity of titanium oxide within the above range is effective for suppressing deterioration in capacity recovery rate of a battery when such a battery is left to still stand repeatedly.

It was here found that a rate of addition of the titanium oxide relative to the positive electrode active material, of more than 1.0% by mass, and a high rate of addition of 2.0% by mass as in Comparative Example 7 caused deterioration in unit capacity. It can be said that setting of the rate of addition of titanium oxide relative to a positive electrode active material, to 1.0% by mass or less, is effective for maintaining the unit capacity.

The present disclosure is not limited to the above nickel-hydrogen secondary battery, can be variously modified and may provide, for example, any other alkali secondary battery such as a nickel-cadmium secondary battery.

ASPECTS OF PRESENT DISCLOSURE

A first aspect of the present disclosure relates to a positive electrode for an alkali secondary battery, including a positive electrode substrate and a positive electrode mixture supported on the positive electrode substrate, wherein the positive electrode mixture includes nickel hydroxide as a positive electrode active material, and a positive electrode additive, the positive electrode additive includes a titanium oxide particle having an anatase-type crystal structure, the titanium oxide particle has an average primary particle size of 5 nm or more and 10 nm or less and a BET specific surface area of 230 m²/g or more and 360 m²/g or less and includes 0.1% by mass or more of niobium oxide, and the rate of addition of the titanium oxide relative to the nickel hydroxide is 0.1% by mass or more and 1.0% by mass or less.

A second aspect of the present disclosure relates to the positive electrode for an alkali secondary battery according to the first aspect of the present disclosure, wherein the titanium oxide has a purity of 90% by mass or more and 95% by mass or less.

A third aspect of the present disclosure relates to an alkali secondary battery including an outer can and an electrode group that is housed in the outer can together with an alkaline electrolytic solution, wherein the electrode group includes a positive electrode and a negative electrode stacked with a separator being interposed therebetween, and the positive electrode is the positive electrode for an alkali secondary battery according to the first aspect or the second aspect of the present disclosure.

EXPLANATION OF REFERENCE SIGNS

2 nickel-hydrogen secondary battery
10 outer can
22 electrode group
24 positive electrode
26 negative electrode
28 separator

The invention claimed is:

1. A positive electrode for an alkali secondary battery, comprising:
 a positive electrode substrate; and
 a positive electrode mixture supported on the positive electrode substrate,
 wherein
 the positive electrode mixture comprises nickel hydroxide as a positive electrode active material, and a positive electrode additive,
 the positive electrode additive comprises a titanium oxide particle having an anatase-type crystal structure,
 the titanium oxide particle has an average primary particle size of 5 nm or more and 10 nm or less and a BET specific surface area of 230 m²/g or more and 360 m²/g or less, and the anatase-type crystal structure comprises 0.1% by mass or more of niobium, and
 a content of the titanium oxide relative to the nickel hydroxide is 0.1% by mass or more and 1.0% by mass or less, and
 the titanium oxide has a purity of 90% by mass or more and 95% by mass or less.

2. An alkali secondary battery comprising:
 an outer can; and
 an electrode group that is housed in the outer can together with an alkaline electrolytic solution,
 wherein
 the electrode group comprises a positive electrode and a negative electrode stacked with a separator being interposed therebetween, and
 the positive electrode is the positive electrode for an alkali secondary battery according to claim 1.

* * * * *